Figure 3:
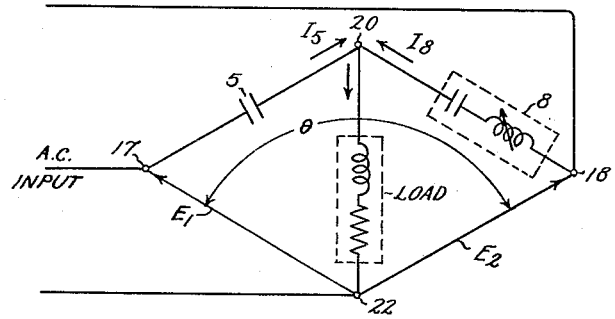

May 27, 1952  B. D. BEDFORD  2,598,437
PHASE SHIFTING NETWORK
Filed July 5, 1951  2 SHEETS—SHEET 1
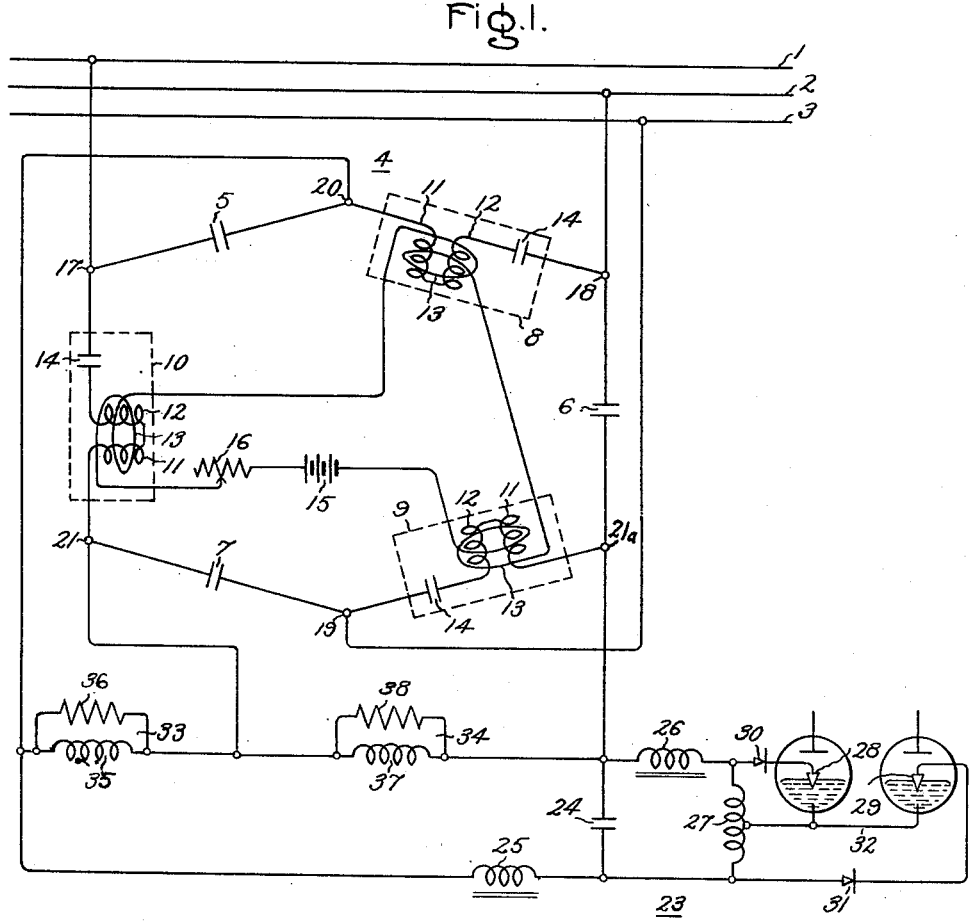
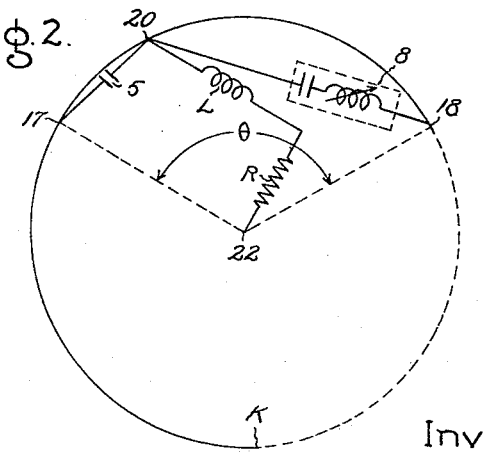
Inventor:
Burnice D. Bedford,
by Ernest C. Britton
His Attorney.

May 27, 1952     B. D. BEDFORD     2,598,437
PHASE SHIFTING NETWORK

Filed July 5, 1951     2 SHEETS—SHEET 2

Inventor:
Burnice D. Bedford,
by Ernest C. Britton
His Attorney.

Patented May 27, 1952

2,598,437

UNITED STATES PATENT OFFICE 2,598,437

PHASE SHIFTING NETWORK

Burnice D. Bedford, Schenectady, N. Y., assignor to General Electric Company, a corporation of New York Application July 5, 1951, Serial No. 235,343

9 Claims. (Cl. 323—124)

1

This invention relates to phase shifting networks and more particularly to static impedance phase shifting networks utilizing a combination of fixed and variable reactance elements for effecting a variation in phase relation between an output voltage of the network relative to an input voltage of the network.

An important use of phase shifting networks has been in connection with tube rectifiers and inverters in order to effect a shift in phase of the voltage applied to a control electrode of the rectifier or inverter tubes relative to the anode voltage, and thereby to control the operation of such rectifiers and inverters. In application Serial No. 84,208, Price, filed March 29, 1949 and assigned to the assignee of this invention, a phase shifting arrangement is disclosed wherein a fixed inductive reactance and a variable inductive reactance are connected in series relation across components of input voltage having various phase relations which are referred to as the "input angle" and wherein an output voltage is taken from the network between a junction point of the reactive elements and a neutral or other displaced output terminal of the network for energizing a load circuit, the voltage of which is to be shifted in phase relative to the input voltage. This Price application also contemplates an arrangement wherein the fixed reactive element may be capacitive and wherein the variable reactive element may be capacitive. The arrangement disclosed in the Price application is capable of producing a substantially constant output voltage with very low losses in the phase shift network but the magnitude of maximum phase shift obtainable with the arrangement disclosed in this Price application is limited to an angle of shift which is twice the input angle of voltage supplied to the network.

An object of my invention is to provide an improved impedance phase shifting network which is characterized by low losses, which is capable of producing substantially constant output voltage, and which is adapted to effect a phase shift over a range which approaches 360 degrees.

In accordance with my invention, a phase shifting network is provided wherein a fixed reactance element is connected in series with a variable reactance element. The variable reactance element is controlled in such a way that its reactance can be varied from a large value of inductive reactance to zero and to a large value of capacitive reactance or vice versa. The fixed and variable reactance elements are connected across components of input voltages having various

2 phase relations referred to as the input angle. From the network is taken an output voltage between the junction point of the reactive elements and a neutral or other displaced terminal on the network for energizing a load circuit, the voltage of which is to be shifted in phase relative to the input voltage.

My invention will be better understood from the following description taken in connection with the accompanying drawing, and its scope will be pointed out in the appended claims.

Figure 4:
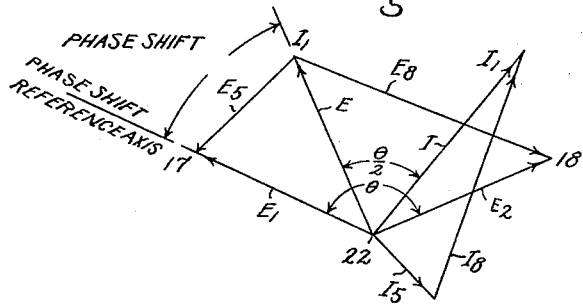
Figure 5:
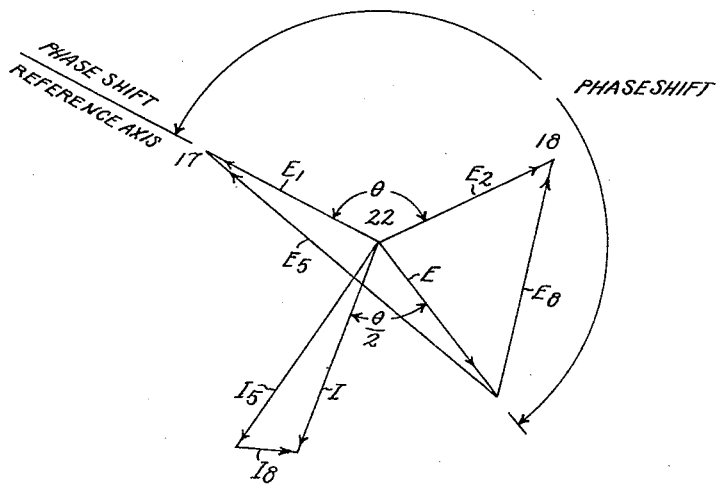

In the drawing Fig. 1 is a diagrammatic representation of one embodiment of the invention as used with a 3 phase circuit; Fig. 2 is a vector diagram to aid in understanding the operation of the arrangement shown in Fig. 1; Fig. 3 is a schematic circuit representative of the arrangement of Fig. 1; and Figs. 4 and 5 are vector diagrams showing voltage and current relations which exist for two different values of reactance for the variable reactance means shown in Fig. 1.

In Fig. 1 of the drawing a polyphase network is represented which is particularly useful for rectifier and inverter circuits since it is connected to operate with an "input angle" of 120 degrees which is directly obtained from a 3-phase power supply. The term "input angle" is used throughout the specification to denote the angle between two of the power supply voltage vectors applied to any given pair of phase shifting elements of the network. It will be understood, however, as the description proceeds, that various input angles may be selected with due regard to the constancy of the load impedance and its power factor angle to obtain the desired objects which I have outlined above, with greater or smaller maximum angles of phase shift in dependence upon the condition selected.

A 3-phase alternating current supply circuit is indicated by the conductors 1, 2, and 3 and it is assumed that, as in the usual 3-phase circuit, there are provided three voltages of equal magnitude which are displaced 120 degrees in time phase. The phase shifting network 4 comprises at least two low loss and preferably (if it were possible) zero loss reactance elements connected in series relation, with one of the elements having a fixed value of reactance and the other having a reactance variable from substantially infinity in the direction of capacitive reactance to zero and substantially to infinity in the direction of inductive reactance. For ease in distinguishing between an inductive reactance and a capacitive reactance the capacitive reactance will be referred to at times as being of opposite sign from that of an inductive reactance. In like manner the distinction between a lagging power factor and a leading power factor will be made at times by referring to a power factor of opposite sign when comparison of a leading power factor is made to a lagging power factor.

The 3-phase network 4 illustrated in Fig. 1 is shown as comprising three fixed capacitive reactance elements 5, 6, and 7 arranged alternately with three variable reactance branch circuits enclosed by dotted lines and indicated by the numerals 8, 9, and 10, and all connected in series relation in mesh connection in the form of a 6-sided polygon, although the conventional 3-phase delta arrangement could equally well represent the network so that a fixed and variable reactance element would appear in each side of the delta. The variable reactance elements 8, 9, and 10 may be of various forms without departing from the invention in its broader aspects. As illustrated, each of these elements comprises a pair of saturable reactors 11 and 12 together with a saturating control winding 13. Variable reactors 11 and 12 could comprise a winding wound on an individual core with the control winding 13 magnetically coupled with both windings 11 and 12, or, if desired, a 3-legged core could be used with the windings 11, 12, and 13 respectively wound on one leg of the core. Arranged in series with the windings 11 and 12 and forming a portion of the variable reactance elements 8, 9, and 10 is a capacitive reactance element 14. Thus, if the winding 13 carries a very low current, the reactors 11 and 12 will not be saturated and the inductive reactance thereof will be relatively high so that the reactance for the branches 8, 9, and 10 would be preponderantly inductively reactive since the value of capacitive reactance for elements 14 would be such that under this condition the effect of the large inductive reactance of elements 11 and 12 would approach infinity insofar as would be practicable. On the other hand and as is well known, a large current flowing through the control winding 13 would effectively reduce the inductive reactance of windings 11 and 12 so that the capacitive reactance of the branches 8, 9, and 10 would predominate due to the effect of capacitors 14. Preferably, the constants of the variable reactance network should be so chosen that the reactance thereof could vary from a value approaching infinity in the inductive reactance direction through zero to a value approaching infinity as a capacitive reactance. Obviously, the series circuit comprising elements 11, 12, and 14 depicted in Fig. 1 could be replaced by a parallel arrangement of capacitive and reactive elements and in this way similar results could be obtained. Furthermore, instead of varying the reactance of the inductive reactance elements, such as 11 and 12, some means could be provided for varying the capacitive reactance of the elements 14. Such means could comprise known mechanical means or, if desired, could comprise a variable inductive reactance means in shunt with the capacitive reactance elements 14. It will be apparent that any suitable means could be used for energizing the control windings 13. For purposes of illustration, there is shown in Fig. 1 a source of direct current energy 15 in series with an adjustable resistance 16 by means of which the magnitude of control current through the control windings 13 can be varied.

The above-mentioned Price application discloses a fixed inductive reactance element arranged in series with a variable inductive reactance element and also contemplates an arrangement wherein a fixed capacitive reactance element could be arranged in parallel with a variable capacitive reactance element as has already been stated. In Price the fixed and variable elements are always of the same sign. According to my invention, the variable element may be either capacitively or inductively reactive depending upon the degree of phase shift desired, although it is within the purview of my invention that the fixed element may be either inductive or capacitive reactance. Thus, with my invention the variable reactance element may be of the same sign as the fixed reactance element for certain magnitudes of phase shift and for different magnitudes of phase shift, the variable reactance element will be of the opposite sign from the fixed reactance element. By this means a much wider angle of phase shift is obtainable, than with the arrangement disclosed in the above mentioned Price application.

The network 4 is provided with input terminals 17, 18, and 19 and with output terminals 20, 21, and 21a which, in this particular case, alternate with the input terminals. The input terminals 17, 18, and 19 are connected respectively to the phase conductors 1, 2, and 3 so that the input angle of the network is 120 degrees. A load circuit 23 is connected across the output terminals 20 and 21a and, as illustrated, is of the type known as an ignitron firing circuit as described in U. S. Patent 2,362,294 granted November 7, 1944, upon an application of A. H. Mittag. This circuit typically comprises a firing capacitor 24 connected to be energized through a linear reactor 25 from the output terminals of the phase shift circuit. The firing capacitor 24 when fully charged discharges through a self-saturating or firing reactor 26 to energize an auto transformer 27 from which the ignitors 28 and 29 are energized in known manner. The ignitor 28 is arranged to be energized through a rectifier 30 from one end terminal of the transformer 27, and the ignitor 29 is connected to be energized through a rectifier 31 from the opposite terminal of transformer 27. A return conductor 32 is connected between the common cathode terminals of the ignitors and the mid-tap of transformer 27. This circuit as is well known has a lagging power factor. The remaining two load circuits 33 and 34 for the application chosen for explanation are intended to represent similar firing circuits of the type indicated by the numeral 23. These load circuits are represented schematically so that the load circuit 33 connected across output terminals 20 and 21 comprises an inductance 35 and a resistance 36 and load circuit 34 connected across output terminals 21 and 21a comprises an inductance 37 and a resistance 38. The particular point of significance for the application of the phase circuit illustrated is that each load circuit has a lagging power factor.

One requirement for phase shift networks of the type disclosed in the above Price application and of the type described above in connection with this invention, is that the power factor of the load circuit must be opposite in sign from the power factor of the network. Since the fixed reactances 5, 6, and 7 are capacitive as shown in Fig. 1, an inductive load circuit, such as 23, 33, and 34, can be used successfully with the fixed elements of the network being capacitive. Another requirement for the arrangement shown in Fig. 1 is that the impedance of the fixed elements 5, 6, and 7 must be twice the sign of the load power factor angle times the load impedance. This same characteristic is also a feature of the arrangement disclosed in the above Price application, it being understood that the fixed elements as shown in that application are inductive reactances while capacitive reactances are shown in Fig. 1 of this application. Another requirement for the networks disclosed in the Price application and in this application is that the power factor angle of the load must be one-half the input angle so that for the particular case illustrated having an input angle of 120 degrees, the power factor of the load impedance must be 50% representing an angle of 60 degrees which angle is equal to one-half the input angle.

A phase shift circuit which would meet the above requirements could be constructed according to the teaching of the above Price application and if so constructed, would produce a maximum phase shift equal to twice the input angle which for the arrangement illustrated in Fig. 1 would amount to 240 degrees of phase shaft since the input angle is 120 degrees.

According to the present invention, a maximum angle of almost 360 degrees may be obtained by using a variable impedance means which may be opposite in sign to that of the fixed impedance means for angles of shift in excess of the maximum shift obtainable by the arrangement disclosed in the above Price application. Stated otherwise, the arrangement comprising my invention operates in manner similar to that disclosed in the above Price application and in so doing achieves a phase shift angle the maximum of which is equivalent to that achieved with the Price arrangement. By causing the variable reactance element to change so that its sign is opposite to that of the fixed reactance element, the maximum angle of shift obtainable is extended from 240 degrees as in Price to an angle which approaches 360 degrees.

Fig. 2 is a vector diagram representing the voltage conditions for all angles of phase shift. Indicated in Fig. 2 are the input terminals 17 and 18 between which is connected the fixed capacitor 5 and the variable reactance element 8. A load circuit comprising the inductance L and the resistance R is connected between the junction 20 between the fixed and variable elements 5 and 8, respectively, and another point 22. Origin point 22 of Fig. 2 is shown for purposes of explanation and represents the neutral of the three-phase output circuit of Fig 1 although the circuits of Fig. 1 are mesh connected and hence do not actually have a neutral point. Of course, the load could be arranged as an equivalent star connected load instead of the mesh load shown and as a result a neutral such as is represented by origin point 22 would be established. In Fig. 2 the angle $\theta$ is the input angle and the dotted lines between point 22 and point 17 and between point 22 and point 18 represent voltage vectors intersecting at the origin 22 to define the input angle $\theta$ for one branch circuit such as that comprising elements 5 and 8. When the variable reactance means 8 is capacitive, the solid portion of the curve of Fig. 2 represents the range of phase shift obtainable. For example, when the elements 8 vary from a value approaching infinity capacitively to zero, the shift obtained will vary from a point on the circle near the point K in a clockwise direction through the points 17 and 20 to the point 18 which point represents resonance for the component 8. When the elements comprising the component 8 are adjusted so that they become inductive and when varied from a zero value to a value approaching infinity, the phase shift obtainable varies from the point 18 in a clockwise direction around the dotted portion of the circle to some position near the point K.

It will be understood that for a series arrangement of the reactance indicated by the numerals 11 and 12 and the capacitance 14, it would be desirable to use a large capacitive reactance element 14 and to vary the inductive reactance of elements 11 and 12 from a value of inductive reactance higher than the capacitive reactance of element 14 to a value which is smaller than the capacitive reactance of the element 14. If the elements 11 and 12 and 14 were arranged so as to form a parallel resonant circuit, relatively low values of capacitive reactance for element 14 would be used and the inductive reactance of elements 11 and 12 would be varied to values in excess of to values below the capacitive reactance of element 14.

It will be understood that the fixed reactance indicated as the capacitor 5 could be an inductive reactance. If an inductive reactance were chosen for the fixed element, such as 5, similar conditions would prevail and the element 8 would be varied to a large value of inductive reactance through zero to some large value of capacitive reactance, and in this way a wide angle of shift would be obtained which would approach 360 degrees.

Fig. 3 represents schematically a circuit such as is shown in Fig. 1. In Fig. 3 the input terminals 17 and 18 are shown as well as the output terminals 20 and 22. The fixed element 5 is shown arranged in series with the variable element 8 and the load is shown connected between the output terminals 20 and 22. The angle $\theta$ represents the input angle. The current $I_5$ and the current $I_8$ represent the currents which flow respectively in the elements 5 and 8.

Fig. 4 shows vectorially the current and voltage relationships for the arrangement shown in Fig. 3. Fig. 4 represents a case where the variable reactance 8 is capacitive; i. e., of the same sign as the fixed reactance element 5. In Fig. 4 the voltage $E_1$ represents the voltage between the terminal 22 and terminal 17, while the voltage $E_2$ represents the voltage between the terminal 22 and the terminal 18. The voltage $E_5$ represents the voltage across the capacitor 5 while the voltage $E_8$ represents the voltage across the variable reactance 8. It will be observed from Fig. 4 that the resultant of these voltages is represented by the vector E. The current $I_5$ flowing through the reactance 5 leads the voltage $E_5$ thereacross by 90 degrees while the current $I_8$ leads the voltage $E_8$ by 90 degrees. The resultant current I representing the vector sum of currents $I_5$ and $I_8$ lags the resultant voltage E by an angle $$\frac{\theta}{2}$$

corresponding to the load power factor angle. The phase shift accomplished for the condition represented in Fig. 4 is indicated on that figure as being in a clockwise direction from the reference axis.

Fig. 5 is a vector diagram similar to that shown in Fig. 4 except that the variable reactance means 8 in Fig. 5 has a value of reactance which is inductive. Similar designations for the various voltage and current vectors are used in Fig. 5 as were used in connection with Fig. 4. From Fig. 5 it will be observed that the current $I_5$ through the fixed capacitive reactance 5 leads the voltage $E_5$ thereacross by 90 degrees and that the current $I_8$ lags by 90 degrees the voltage $E_8$ across the variable reactance element 8 which in this case is inductive. The resultant current I lags the resultant voltage E by an angle $$\frac{\theta}{2}$$

which corresponds to the load power factor angle.

In view of the above description it will be understood that by my invention it is possible to obtain a phase shift over a range approaching 360 degrees by using a fixed reactance element and a variable reactance element, the variable reactance element being arranged so that it can vary from a very large reactance value of one sign through zero to a very large value of the opposite sign relative to the sign of reactance of the fixed reactance element.

While I have shown and described particular embodiments of the invention, it will be obvious to those skilled in the art that various changes and modifications may be made without departing from the invention and I therefore intend in the appended claims to cover all such changes and modifications as fall within the true spirit and scope of the invention.

What I claim as new and desire to secure by Letters Patent of the United States is:

1. An impedance phase shifting network comprising fixed reactive means and variable reactive means connected in series relation therewith to form a branch circuit of said network and forming a junction point therebetween, means for adjusting the reactance of said variable reactive means over a range of reactance including values of inductive and capacitive reactance, an input circuit connected to the extremities of said branch circuit for supplying input voltage components thereto, said voltage components when represented as vectors on a voltage diagram intersect at a fixed origin point and define therebetween an input angle for said branch circuit, an output circuit energized from said network, the voltage supplied to said output circuit being adjustable in phase displacement relative to said input voltage and to said origin point due to changes in the reactance of said variable reactive means, and a load circuit energized from said output circuit, said load and said output circuit being equivalent to an impedance interconnected between said junction point and said origin point and having a substantially constant value of impedance, and a power factor angle equal to one-half of said input angle and of opposite sign to the reactive characteristic of said fixed reactive means.

2. An impedance phase shifting network comprising fixed reactive means and variable reactive means connected in series relation therewith to form a branch circuit of said network and forming a junction point therebetween, the reactance of said variable reactive means being controllable from values of inductive reactance approaching infinity to values of capacitive reactance approaching infinity, an input circuit connected to the extremities of said branch circuit for supplying input voltage components thereto, said voltage components when represented as vectors on a voltage diagram intersect at a fixed origin point and define therebetween an input angle for said branch circuit, an output circuit energized from the network, the voltage supplied to said output circuit being adjustable in phase displacement relative to said input voltage and to said origin point due to changes in the reactance of said variable reactive means, and a load circuit energized from said output circuit, said load and said output circuits being equivalent to an impedance interconnected between said junction point and said origin point and having a substantially constant value of impedance and a power factor angle equal to one-half of said input angle and of opposite sign to the reactive characteristic of said fixed reactive element.

3. An impedance phase shifting network comprising a fixed capacitive reactance element and a variable reactance element connected in series relation therewith to form a branch circuit of said network and forming a junction point therebetween, means for adjusting the reactance of said variable reactance element over a range of reactance extending between values of inductive reactance approaching infinity to values of capacitive reactance approaching infinity, an input circuit connected to the extremities of said branch circuit for supplying input voltage components thereto, said voltage components when represented as vectors on a voltage diagram intersect at a fixed origin point and define therebetween an input angle for said branch circuit, an output circuit energized from said network, the voltage supplied to said output circuit being adjustable in phase displacement relative to said input voltage and to said origin point due to changes in the reactance of said variable reactance means, and a load circuit energized from said output circuit, said load and said output circuits being equivalent to an impedance interconnected between said junction point and said origin point and having a substantially constant value of impedance and a lagging power factor angle equal to one-half of said input angle.

4. An impedance phase shifting network comprising a fixed inductive reactance element and a variable reactance element connected in series relation therewith to form a branch circuit of said network and forming a junction point therebetween, means for adjusting the reactance of said variable reactance element over a range of reactance extending between values of inductive reactance approaching infinity to values of capacitive reactance approaching infinity, an input circuit connected to the extremities of said branch circuit for supplying input voltage components thereto, said voltage components when represented as vectors on a voltage diagram intersect at a fixed origin point and define therebetween an input angle for said branch circuit, and an output circuit energized from the network, the voltage supplied to said output circuit being adjustable in phase displacement relative to said input voltage and to said origin point due to changes in the reactance of said variable reactance element, said output circuit being equivalent to an impedance interconnected between said junction point and said origin point and having a substantially constant value of impedance and a leading power factor angle equal to one-half of said input angle.

5. An impedance phase shifting network comprising fixed reactive means and variable reactive means connected in series relation therewith to form a branch circuit of said network and forming a junction point therebetween, means for adjusting the reactance of said variable reactive means over a range of reactance including values of inductive and capacitive reactance, an input circuit connected to the extremities of said branch circuit for supplying input voltage components thereto, said voltage components when represented as vectors on a voltage diagram intersect at a fixed origin point and define therebetween an input angle for said branch circuit, an output circuit energized from the network, the voltage supplied to said output circuit being adjustable in phase displacement relative to said input voltage and to said origin point due to changes in the reactance of said variable reactive means, and a load circuit energized from said output circuit, said load and said output circuit being equivalent to an impedance interconnected between said junction point and said origin point and having a substantially constant value of impedance and a power factor angle equal to one-half of said input angle and of opposite sign to the reactive characteristic of said fixed reactive element, the impedance of said fixed reactive element being twice the sign of the load power factor angle times the load impedance.

6. An impedance phase shifting network comprising fixed reactive means and variable reactive means connected in series relation therewith to form a branch circuit of said network and to form a junction point therebetween, means for adjusting the reactance of said variable reactance means over a range of values including inductive reactance approaching infinity to values of capacitive reactance approaching infinity, an input circuit connected to the extremities of said branch circuit for applying input voltage components thereto, said voltage components when represented as vectors on a voltage diagram intersect at a fixed origin point and define therebetween an input angle of 120 degrees for said branch circuit, an output circuit energized from the network, the voltage supplied to said output circuit being adjustable in phase displacement relative to said input voltage and said origin point due to changes in the reactance of said variable reactive means, and a load circuit energized from said output circuit, said load and said output circuits being equivalent to an impedance interconnected between said junction point and said origin point which has a substantially constant value of impedance and a 50% power factor of opposite sign to the reactive characteristic of said fixed reactive element, the value in ohms of said fixed reactive element being twice the sign of the load power factor angle times the load impedance.

7. An impedance phase shifting network comprising fixed reactive means and variable reactive means connected in series relation therewith to form a branch circuit of said network and to form a junction point therebetween, said variable reactance means including a fixed capacitive element and a variable inductive element, the reactance of said variable inductive element being controllable from values of inductive reactance approaching infinity to smaller values of inductive reactance of such magnitude that the resultant reactance of said fixed capacitive element and of said variable inductive element is capacitive, an input circuit connected to the extremities of said branch circuit for supplying input voltage components thereto, said voltage components when represented as vectors on a voltage diagram intersect at a fixed origin point and definie therebetween an input angle for said branch circuit, an output circuit energized from the network, the voltage supplied to said output circuit being adjustable in phase displacement relative to said input voltage and to said origin point due to changes in the reactance of said variable reactive means, and a load circuit energized from said output circuit, said load and said output circuits being equivalent to an impedance interconnected between said junction point and said origin point which has a substantially constant value of impedance and a power factor angle equal to one-half of said input angle.

8. An impedance phase shifting network comprising fixed reactive means and variable reactive means connected in series relation therewith to form a branch circuit of said network and to form a junction point therebetween, said variable reactive element including a fixed capacitive element and a variable inductive element, the reactance of said variable inductive element being controllable from values of inductive reactance approaching infinity to smaller values of inductive reactance of such magnitude that the resultant reactance of said fixed capacitive element and of said variable inductive element is capacitive, an input circuit connected to the extremities of said branch circuit for supplying input voltage components thereto, said voltage components when represented as vectors on a voltage diagram intersect at a fixed origin point and define therebetween an input angle for said branch circuit, an output circuit energized from the network, the voltage supplied to said output circuit being adjustable in phase displacement relative to said input voltage and to said origin point due to changes in the reactance of said variable reactive means, and a load circuit energized from said output circuit, said load and said output circuits being equivalent to an impedance interconnected between said junction point and said origin point which has a substantially constant value of impedance and a power factor angle equal to one-half of said input angle.

9. A phase shifting network comprising a plurality of input terminals, a polyphase input circuit for applying to the respective input terminals voltages equally displaced in phase at an angle in electrical degrees constituting the input angle of said network, a pair of serially connected fixed and variable reactive elements connected between each pair of input terminals to form said network, the reactance of said variable reactive element being controllable over a range extending between values of inductive reactance through zero to values of capacitive reactance, a plurality of output terminals provided at points around said network which alternate with said input terminals, and an output circuit connected to each of the respective pairs of output terminals for connection to a polyphase load circuit having a power factor angle opposite in sign to the reactive characteristic of said fixed reactive elements and of a value in degrees equal to one-half the phase displacement between the voltages of adjacent pairs of input voltage terminals.

BURNICE D. BEDFORD.

No references cited.